June 24, 1969

W. C. CONKLING

3,452,170

ALARM SWITCHING DEVICE FOR VARIABLE
RESTRICTION FLUID FLOW METERS

Filed June 27, 1967

INVENTOR.
WILLIAM C. CONKLING
BY
Robert S. Dunham
ATTORNEY

INVENTOR.
WILLIAM C. CONKLING
BY
Robert S. Dunham
ATTORNEY 3,452,170
ALARM SWITCHING DEVICE FOR VARIABLE
RESTRICTION FLUID FLOW METERS
William C. Conkling, Essex Fells, N.J., assignor to Wallace & Tiernan Inc., Belleville, N.J., a corporation of Delaware
Filed June 27, 1967, Ser. No. 649,172
Int. Cl. H01h 35/40
U.S. Cl. 200—81.9   11 Claims

ABSTRACT OF THE DISCLOSURE

An alarm switch for a variable restriction fluid flow meter, suitable for actuating an alarm to signal increase or decrease in fluid flow rate beyond a selected value, including a rotatable magnet coupled in such manner to a magnet carried by the meter float that the angular position of the rotatable magnet varies with and is determined by the level of the float; a reed switch located in the field of the rotatable magnet; and a biasing magnet for the reed switch, so disposed that the magnetic field acting on the reed switch varies progressively with change in angular orientation of the rotatable magnet relative to the biasing magnet in a manner producing opening (or closing) of the reed switch at some particular relative angular orientation of the two magnets. The reed switch and biasing magnet are carried in a common support which can be turned to effect angular displacement of the switch and biasing magnet relative to the rotatable magnet, thereby to select the angular position of the rotatable magnet (corresponding to a selected float level) at which the switch-opening or closing relative orientation of the rotatable magnet and biasing magnet occurs.

Background of the invention

This invention relates to devices for automatically switching electric circuits in response to displacement of a movable element beyond a preselected position, and more particularly to such devices having a switch actuated by changes in a magnetic field produced by interaction of a stationary biasing magnet and another magnet which is displaceable with the movable element. In a specific aspect, the invention is directed to alarm switches for variable restriction fluid flow meters, arranged to actuate an alarm to signal increase or decrease in fluid flow rate beyond a preselected level.

In a variable restriction fluid flow meter the fluid to be metered flows upwardly through a vertically oriented tube having disposed therein a vertically movable float which rides in the stream of fluid. The tube and float cooperate to define an annular space for passage of fluid between them, that varies in cross-sectional area depending on the vertical position of the float. For example, one form of such meter has an elongated downwardly-tapering float and a shorter cylindrical tube; an alternative form has an elongated downwardly tapering tube and a shorter float. In both forms, as will be understood, the area of the annular space for fluid flow increases as the float moves upwardly. The combination of upward and downward forces acting on the float during flow of fluid through the meter is such that the float assumes a unique and essentially constant vertical position within the meter tube for any given constant rate of flow of a given fluid passing through the meter, within the range of flow rates measurable by the meter; and as the flow rate increases or decreases, the float rises or falls in the meter tube in correspondence therewith. Thus the vertical level of the float in the tube provides an indication of the flow rate and may be read as such by means of a suitable indicating mechanism.

As desired for various operations, a meter of the foregoing type is sometimes equipped with an alarm device for signalling increase of flow rate above, or decrease of flow rate below, a given value. One form of alarm device used for such purpose includes an electrical alarm actuated by closing or opening of a reed switch in response to movement of the meter float in a given (upward or downward) direction beyond a predetermined level, i.e. as representative of flow increase above, or decrease below, the particular flow rate corresponding to that float level. In devices of this type as heretofore known and used, the reed switch (a magnetic field-responsive switch element that is normally open but is adapted to close under the influence of a sufficiently strong magnetic field) is disposed in the field of a small, fixed biasing magnet having a field strength inadequate to effect closing of the reed switch although great enough to hold it in closed condition; and the reed switch and biasing magnet together are positioned at a preselected level adjacent the path of a second magnet carried by the meter float for vertical movement therewith, the magnets being so arranged that as the second magnet passes the reed switch it interacts with the biasing magnet, reinforcing or depleting the biasing magnet field sufficiently to close or open the reed switch.

Heretofore the second magnet has typically (and preferably) been mounted on a rod extending vertically upward from the float above the meter tube and closely surrounded by an extension tube of relatively small diameter and thickness. The reed switch and biasing magnet have been positioned externally of the extension tube, in closely adjacent relation thereto (and thus in proximity to the path of the magnet carried by the rod) at a level selected to provide switching action upon movement of the float in a given direction to a position corresponding to a predetermined flow rate.

By way of example, in an illustrative alarm device of this known type arranged for indicating a condition of excessive flow rate, the alarm may be adapted to operate upon closing of the reed switch, and the relative polar orientations of the biasing magnet and float magnet may be such that the magnets interact to produce closing of the switch (by reinforcements of the field strength at the switch) upon upward movement of the float and float magnet to a given level which is determined by the vertical position of the reed switch and biasing magnet and is representative of increase in fluid flow rate to a particular value. Once the reed switch has been closed, the field strength of the biasing magnet is sufficient to hold it closed as the float magnet moves further upward beyond such level and away from the biasing magnet. When the float magnet descends again, to a second level somewhat lower than the first level, the two magnets interect in such manner as to deplete the field at the switch, allowing the switch to re-open, and thereafter as the float magnet moves further downward away from the biasing magnet the switch remains open because the biasing magnet alone is not strong enough to close it.

In this way there is provided a direction-sensitive alarm response to change in flow rate beyond a predetermined value. That is to say, increase of flow rate above such value causes the alarm to be switched on and to remain operative as long as the flow rate exceeds that value; while decrease in the flow rate causes the alarm to be switched off again and then to remain inoperative as long as the flow rate remains below the alarm-actuating-value. Consequently, the alarm provides a signal, as desired, only when the flow rate is excessive. Although the switch-opening level of the float magnet is, as stated, spaced apart from the switch-closing level (the distance between these levels being termed the operating differential), in devices having the float magnet housed within an extension tube this operating differential is small enough—e.g. not more than about 10% of the total length of the float path of travel—for satisfactory alarm operation.

A disadvantage of the described devices is that they are not conveniently or readily adjustable to change the value of flow rate at which the alarm is actuated. Since this value is determined by the level at which the reed switch and biasing magnet are positioned, such adjustment requires vertical displacement of these elements relative to the meter—a more or less difficult operation, depending on the manner in which the switch and biasing magnet are mounted on the meter structure.

Furthermore, it has been found that these known switching devices are not suitable for use with variable restriction fluid flow meters arranged for vertical fluid entry and exit, i.e. meters which provide a continuous, straight vertical path for fluid through the meter to a conduit extending coaxially with and vertically above the meter tube, as necessary or convenient for various metering applications. In a vertical fluid entry and exit meter, it is not feasible to provide a float magnet housed in a small-diameter extension tube projecting beyond the meter structure; instead, the float magnet must be disposed within the meter tube itself—which is necessarily large in diameter as compared with such an extension tube—and hence the reed switch and biasing magnet, positioned outside the meter tube, must be spaced significantly farther from the float magnet than in structures having an extension tube for the float magnet. This increased spacing causes conventional reed switch and biasing magnet arrangements to exhibit undesirably high operating differentials between the levels at which the switch opens and closes, e.g. differentials as large as 20% to 30% of the total length of float travel. If the biasing magnet is omitted, the switch lacks directional sensitivity with the result that double switching occurs, i.e. the switch responds in the same way to downward float movement as to upward float movement past the switching level; the switch is overly sensitive to magnetic field variations and is erratic in operation; and the operating differential is still high.

Summary of the invention

The present invention broadly contemplates a device for switching an electric circuit in response to displacement of a movable element beyond a preselected position, including a first rotatable magnet arranged to undergo angular displacement in correspondence with movement of the movable element; a second, biasing magnet, positioned to interact with the first magnet to establish at a given locality a magnetic field varying in strength with change in the angular orientation of the first magnet relative to the biasing magnet; and a magnetic field-responsive circuit switching element positioned at the aforementioned locality and operable by variations in field strength at that locality to open and close the circuit.

The first magnet has spaced opposite poles and is mounted for angular displacement, in a plane of rotation containing its magnetic axis, about an axis of rotation intersecting its magnetic axis intermediate the poles. The biasing magnet is disposed to one side of the plane of first-magnet rotation with at least one pole positioned eccentrically of the axis of first-magnet rotation, so that angular displacement of the first magnet about such axis changes the angular orientation of the first magnet poles relative to the biasing magnet poles and thereby changes the strength of the magnetic field acting on the switching element.

Specifically, movement of the first magnet through a 180° range of angular orientations relative to the biasing magnet effects progressive variation in such field strength from a minimum value at which the switch is open to a maximum value at which the switch is closed. Field strength sufficient to close the switch is attained at an intermediate orientation of the first magnet relative to the biasing magnet, herein termed the switching point. If the first magnet is permitted to undergo a full 360° rotation relative to the biasing magnet, it passes through a second switching point about 180° from the first switching point; however, the angular excursion of the first magnet corresponding to the full range of movement of the movable element is preferably limited to 180° or less so that the magnet can pass through only one switching point, to avoid ambiguity of switching.

In the operation of this device (with the biasing magnet held fixed), as the first magnet moves from an initial orientation corresponding to minimum field strength, the switch is open and remains open until the first magnet reaches the switching point. The switch then closes and remains closed as the first magnet moves beyond the switching point toward the orientation corresponding to maximum field strength. Upon return of the first magnet through the switching point toward the minimum field strength orientation, the switch again opens. The precise switch-opening and switch-closing positions of the first magnet relative to the biasing magnet are spaced apart by a small operating differential, but this differential is ordinarily not more than about 10% of the total angular path of first-magnet travel.

Since the angular position of the first magnet is uniquely determined by the position of the movable element, movement of such element in one direction increases the field strength at the switch, while oppositely directed movement of the movable element decreases the field strength; and for any given fixed position of the biasing magnet, the switching point orientation of the first magnet relative thereto corresponds to some particular position of the movable element. Thus, when the movable element reaches that position, travelling in the direction of increasing field strength, the switch closes. Until the movable element reaches that position, the switch is open. After the movable element passes that position, the switch remains closed, re-opening only when the movable element returns in the opposite direction so as to displace the first magnet back through the switch-opening point. In this way, the device provides a directionally sensitive switching response to movable element motion.

To enable the switch readily to be set to operate at a selected position of the movable element, and to facilitate changing of this switch setting, the invention further contemplates the provision of means for effecting (as by manual adjustment) angular displacement of the biasing magnet about an axis substantially coincident with the axis of rotation of the first magnet. Such angular adjustment of the biasing magnet position changes the relative angular orientation of the first and biasing magnets at any given angular position of the first magnet so as to establish the switching point (i.e. the particular relative angular orientation of the two magnets at which the switch opens or closes) at any selected first-magnet angular position, i.e. corresponding to a selected position of the movable element. The adjusting means for the biasing magnet, in an illustrative embodiment, comprises a manually rotatable mounting for the biasing magnet and switching element, and is adapted to be held fixed as by friction in any position to which it is turned.

As incorporated in a variable restriction fluid flow meter for use as an alarm switch (or to provide any other desired control function), the described device is mounted in such position that the first magnet is coupled to a magnet carried by the meter float, with the axis of rotation of this first magnet disposed in a plane perpendicular to the axis of the vertical path of float and float magnet movement. The dimensions of the float magnet and the first magnet, and the position of the first magnet in relation to the float magnet path of travel, are selected so that the first magnet undergoes angular displacement (following the linear displacement of the magnet) of not more than about 180° as the float and float magnet move between the limits of their travel path.

The angular displacement of the rotatable magnet, as thus mounted, is found to be substantially linearly proportional to the vertical movement of the float and float magnet. By adjustment of the angular position of the biasing magnet in the manner described above, the switch can readily be set to open (or close) at any selected float level, corresponding to a given flow rate. The switch may be arranged and connected to actuate an alarm signal upon either increase of flow rate above, or decrease of flow rate below, such given value. Highly sensitive and reliable operation, with desirably high repeatability of alarm actuation at the particular selected float level, is thereby achieved. Further, the device is suited for use with a vertical fluid entry and exit meter having a float magnet carried by the float within the meter tube; in such use, it exhibits an operating differential of not more than about 5 to 10% of the total length of the float path. The device may be mounted in fixed position externally of the meter tube, and changes in switching point (i.e. selection of the value of flow rate at which alarm switching occurs) may be effected simply by turning the support for the biasing magnet and switch, without changing the vertical position of the switching device relative to the meter.

Further features and advantages of the invention will be apparent from the detailed description hereinbelow set forth, together with the accompanying drawings.

Detailed description

Figure 1:
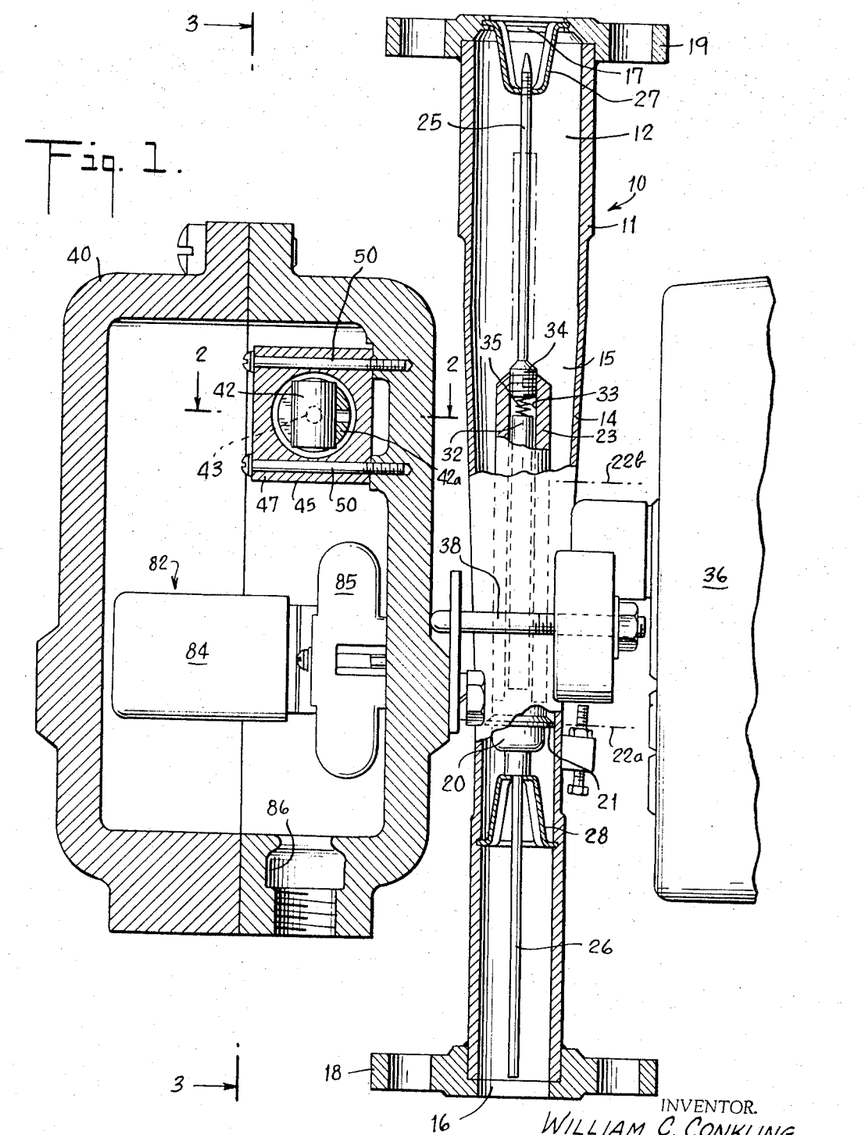
FIG. 1 is a side elevational sectional view of an alarm switching device embodying the invention mounted on a variable restriction fluid flow meter.

Referring first to FIG. 1, the invention in its illustrated form is shown as incorporated in a variable restriction flow meter 10 of the tapered tube type arranged for vertical fluid entry and exit. This meter structure includes a fixed tube 11 of metal or the like, defining an axially vertical passage 12 for upward flow of fluid to be metered, and having a tapered portion 14 shaped to provide an elongated and downwardly tapering portion 15 of the passage. Fluid entering the passage through inlet 16 at the lower end of the tube departs through outlet 17 at the upper end. Lower and upper flanges respectively designated 18 and 19 are secured to the ends of the tube for mounting the meter in a fluid conduit system.

A float 20 is positioned within the passage 12 for guided motion therein along a vertical rectilinear path coincident with the passage axis. The float includes a disc-shaped float 21 with a diameter slightly smaller than the passage diameter at a preselected lower level 22a in the tapered passage portion 15, and also has a cylindrical portion 23 extending upwardly from the float head along the passage axis. A pair of vertical guide rods 25 and 26, carried by the float, respectively extend above and below the float through fixed guide spiders 27 and 28 which are respectively mounted in the upper and lower ends of the passage 12 and are adapted to permit vertical movement of the guide rods while preventing lateral displacement of the rods and float. Upper and lower limits of vertical float travel are determined by abutment of the float structure with the guide spiders when the float is at the extremities of its path of travel; in this way, movement of the float head is restricted to a vertical path extending from the lower level 22a to an upper level 22b in the tapered passage portion 15.

In the illustrated arrangement, the float 20 is adapted to move vertically through the passage during fluid flow, in effect riding on the stream of fluid in the passage. The float head 21 and the tapered tube wall 14 cooperate to define an annular space for flow of fluid between the tube and float; owing to the downward taper of passage portion 15, the cross-sectional area of this annular space becomes progressively larger as the float head 21 is elevated above the level 22a. In accordance with well known principles of variable restriction flow meter operation, when fluid is flowing through the passage 12 the float assumes a position in the passage which at any instant is uniquely determined by the rate of fluid flow through the passage at such instant, so that the float position provides an indication or measurement of this flow rate; increase in flow rate causes the float to rise, while decrease of flow rate causes the float to fall.

Within the upper cylindrical float portion 23, there is disposed an axially elongated and end-polarized permanent bar magnet 32 (herein termed the float magnet) so oriented that its magnetic axis coincides with the axis of the path of float travel in the passage 12. Thus, as the float head 21 moves between the levels 22a and 22b, the float magnet 32 is displaced vertically in the direction of its magnetic axis between correspondingly spaced upper and lower levels in the meter tube passage. In assembling the float, the float magnet 32 is placed in a central bore 33 of the cylindrical float portion 23 and an enlarged lower head portion 34 of the upper guide rod 25 is then threaded into the upper end of bore 33, a small helical spring 35 under compression being interposed in the bore between the upper end of magnet 32 and the guide rod head 34.

With the meter structure shown, there may be employed means for providing, at a locality external to the meter tube 11, a continuous indication of the float position as a measure of flow rate through the passage. A suitable form of indicator mechanism for such purpose is described in United States Patent No. 3,315,523, issued Apr. 25, 1967, to William C. Conkling. Such mechanism includes a rotatable permanent magnet (not shown) positioned so as to be coupled magnetically to the float magnet 32 and to undergo angular displacement in correspondence with vertical linear movement of the float magnet along the tube passage; the rotatable magnet is connected to a needle which moves across the face of a suitably calibrated dial (also not shown) to indicate float position as a measure of flow rate. Such indicator mechanism may be enclosed within a housing 36 which is secured to the meter tube 11 by means of a bracket 38 surrounding the tube. It will be appreciated that the indicator means forms no part of the present invention and accordingly need not be described in detail.

As arranged for alarm switching operation with the above-described flowmeter structure, the switching device of the present invention in its illustrated embodiment is contained within a housing 40 of suitable nonmagnetic material, which is supported in fixed position externally of the meter tube 11, conveniently by means of the same bracket 38 that secures the indicator housing 36. This device includes an end-polarized permanent bar magnet 42 (e.g. an Alnico magnet) clamped by friction fit in an aluminum support 42a which is mounted by anti-friction bearings 43 in a surrounding aluminum enclosure 45, in such manner as to permit free rotation of the magnet 42 and support 42a within the enclosure, in a plane of rotation containing the magnetic axis of the magnet and about an axis of rotation perpendicularly intersecting that magnetic axis at a point halfway between the two poles of the magnet.

The enclosure 45, comprising a hollow frame 47 and cover plates 48 that receive the bearings 43 and are held in place over the opposed open ends of the frame by screws 49, serves to protect the magnet and bearings from dirt and contamination. It is secured as by screws 50 to the inner surface of the front wall of housing 40 (i.e. the vertical wall facing the meter tube 11) in such position that the axis of rotation of magnet 42 lies in a horizontal plane which perpendicularly intersects the vertical path of travel of the float magnet 32 at a locality intermediate the ends of such path.

Specifically, the magnet 42 is positioned to be magnetically coupled to the float magnet 32 through the tube and housing walls and to undergo angular displacement about its rotational axis, by virtue of this coupling, in substantially linear proportion to vertical movement of the float magnet over the entire length of the float magnet path, the magnet 42 assuming a unique angular position for each vertical position of the magnet 32. For example, the axis of rotation of the magnet 42 may (as shown) lie in the plane perpendicularly bisecting the float magnet travel path and may be so oriented that the axis of the float magnet path lies in the plane of rotation of the magnet 42. By appropriate selection of the relative lengths and dispositions of the two magnets, the total angular excursion of the magnet 42 corresponding to vertical movement of the float magnet 32 over the entire float magnet path length is established at a value less (preferably slightly less) than 180°.

The device of the invention further includes a switching assembly generally designated 52, which comprises a switch-holding element 54 rotatably supported by the housing 40, and a reed switch 55 and associated biasing magnet 56 mounted in the switch holder 54. As particularly shown in FIGS. 2 and 3, the switch holder 54 has a cylindrical shaft 58 extending through a bore 59 in a side wall of the housing 40 toward the magnet enclosure 45 along an axis substantially coincident with the axis of rotation of magnet 42. At its inner end, immediately adjacent one side of the magnet enclosure 45 but slightly spaced therefrom, switch holder 54 terminates in an enlarged head portion 61 which carries the biasing magnet and reed switch.

The fit between shaft 58 and bore 59 is sufficiently free to permit rotation of the switch holder 54 about its long axis (which is coincident with the axis of rotation of magnet 42, as stated) relative to the housing 40. Inwardly of the housing, the switch holder shaft 58 is surrounded concentrically by a helical spring 63 under compression between the head 61 and a boss 64 formed integrally with the housing wall. The spring maintains the head 61 in closely proximate relation to the magnet enclosure 45 and also exerts a frictional force on the head 61 to oppose rotation of the switch holder 54. Thus, while the switch holder can readily be turned on its axis of rotation by application of external (e.g. manual) force, in the absence of such force it is held fixed by the spring 63 in any position at which it is set. The outer end 66 of shaft 58 projects externally of the housing 40 to facilitate manual turning of the switch holder, and bears a C-ring 66a which serves as a stop engaging the outer wall of the housing to prevent inward axial movement of the switch holder.

The portion of the switch holder 54 within the housing 40 carries a stop pin 67a extending transversely of the axis of the switch holder. This stop pin is arranged to engage portions of the housing structure, e.g. including a lug 67b projecting inwardly from the forward housing wall, in such manner as to limit manual turning of the switch holder to a predetermined angular range.

The reed switch 55 may be of conventional form, having a pair of flexible metal leaves 68 extending toward each other in overlapping but normally spaced relation within a hermetically sealed tubular glass envelope 70 which contains an atmosphere of hydrogen. A pair of contacts 72 respectively connected to the two leaves 68 project from the opposite ends of the tubular envelope 70 to enable external electrical connections to be made to the switch. The exposed ends of a pair of electrically insulated lead wires 73 are respectively soldered to the contacts 72. For insulation of these exposed external contacts, a length of hollow "spaghetti"-type tubular plastic electrical insulating material (omitted from the drawings for simplicity of illustration) may be slipped over the reed switch and contacts, and heated sufficiently to contract tightly over the switch and the connections of the external contacts to the lead wires.

A reed switch of the type described is adapted to operate in response to variations in strength of a magnetic field in which it is positioned. In the absence of a magnetic field, the leaves of the switch are spaced apart and hence the circuit in which the switch is connected is open. However, when a magnetic field of sufficient strength acts on the switch, the leaves are brought together (i.e. bent into contact) so as to close the circuit, and remain in circuit-closing contact as long as the field strength at the switch is maintained at or above some particular value. Upon reduction of field strength below such value, the resilient leaves spring apart again, reopening the circuit. The field strength required to close the switch when open is somewhat greater than that at which the switch reopens when closed; this difference in values of the switch-closing and switch-opening field strengths produces the operation differential of the reed switch.

Figures 2, 4, 5, 11:
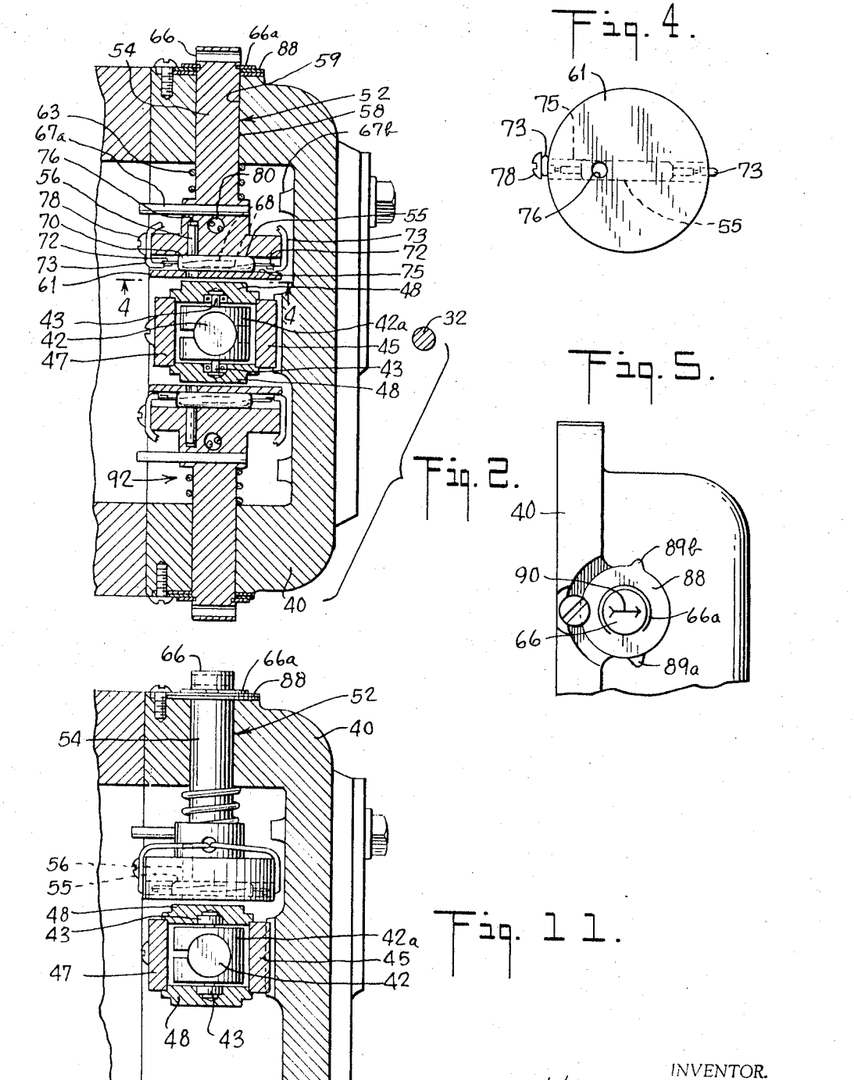
FIG. 2 is a sectional plan view of the switching device taken along the line 2—2 of FIG. 1.
FIG. 4 is an elevational view of the inner end of the support structure for the biasing magnet and reed switch in the switching device of FIG. 1.
FIG. 5 is a view of the outer end of the support structure shown in FIG. 4.
FIG. 11 is a rear elevational sectional view similar to FIG. 3, showing the switching device of FIG. 1 as modified to include a single switch.

As best shown in FIGS. 2 and 4, the reed switch 55 is received within an open-ended bore 75 which extends transversely through the switch holder head 61 perpendicularly to the axis of rotation of the switch holder, so that the reed switch is disposed in adjacent relation to the rotatable magnet 42 with its leaves lying generally parallel to the plane of rotation of magnet 42. The lead wires 73 project from the switch 55 through the opposite ends of the bore 75.

A second bore 76 extends part way through the head 61 from the inner surface thereof, intersecting the bore 75 and continuing into the head beyond that bore, away from the rotating magnet. The bore 76 parallels the axis of rotation of the switch holder 54 and rotatable magnet 42 but is disposed to one side (i.e. eccentrically) of such axis. Within the bore 76 is positioned the biasing magnet 56, which is a small, end-polarized permanent bar magnet, e.g. an Alnico magnet. The biasing magnet 56 is oriented in bore 76 with its magnetic axis parallel to the axis of rotation of the switch holder and magnet 42, being disposed in the bore on the side of switch 55 away from the magnet 42 and in abutting relation to the switch envelope; thus, as particularly shown in FIG. 2, the poles of magnet 56 are positioned eccentrically of the axis of rotation of magnet 42.

As hereinafter further explained, in the described arrangement the rotatable magnet 42 and biasing magnet 56 interact to produce, in the locality of switch 55, a magnetic field that varies in strength between a minimum value at which the switch is open and a maximum value at which the switch is closed, depending upon the angular orientation of magnet 42 relative to magnet 56. As will further be apparent from FIG. 4, the angular position of the biasing magnet relative to the axis of rotation of magnet 42 (and hence relative to any given position of magnet 42) may be changed by turning the switch holder 54 about such axis.

In the assembly of the described device, the biasing magnet 56 is first inserted into the bore 76 through the bore opening in the switch holder head 61, and the reed switch 55 is then slipped into the bore 75. When the reed switch is thus positioned, it blocks the opening of bore 76 so as to retain the biasing magnet 56 in place. The reed switch is held in bore 75 by twisting one of the lead wires 73 around a small screw 78 mounted on the side of the switch holder head 61. Positive retention of the switch and biasing magnet in operative position is thereby afforded in a structurally simple and convenient manner.

The lead wires 73 extend from the opposite ends of bore 75 through another transverse bore 80 in the switch holder 54 to selected terminals of a suitable relay 82 (e.g. a conventional double-pole double-throw relay) also mounted within the housing 40, these wires being sufficiently long to enable free turning of the switch holder through its entire permitted angular range. Relay 82, which includes a relay unit 84 supported on a relay terminal strip 85 secured to the inner forward wall of housing 40, is provided to increase the current load capacity of the switching device; however, the capacity of the reed switch itself is sufficient to enable it to operate many types of alarm devices directly, and in use with such devices a relay is not necessary. An external alarm device (not shown) may be connected to the terminals of the relay 82 by suitable wiring (also not shown) extending through an opening 86 in the base of the housing 40.

As hereinafter further explained, the switching device described above operates the relay 82 to actuate the alarm upon movement of the meter float 20 in a predetermined direction to a predetermined position as representative of increase or decrease in fluid flow rate to some particular value. This operation is effected by opening or closing of the reed switch in response to changes in the magnetic field acting thereon resulting from change in angular position of the rotatable magnet 42.

The float level at which the switching action occurs is determined by the angular position of the biasing magnet 56, such angular position being settable (by turning the switch holder 54) to correspond with any desired level of the float between the upper and lower extremities of the path of float travel. The range of biasing magnet angular positions thus defined lies within the angular range of motion of the swtich holder, as determined by the disposition of stop pin 67a and associated stop portions of the housing 40.

As shown in FIG. 5, an indicator plate or disc 88 may be mounted on the outer side wall of the housing 40 in surrounding relation to the projecting outer end 66 of the switch holder 54 and may be provided with angularly spaced indicator tabs 89a and 89b, the switch holder extremity 66 being marked with an arrow 90 to indicate the angular position of the biasing magnet. Indicator tabs 89a and 89b respectively represent the angular positions of the biasing magnet which produce switching action when the float is at the lower and upper limits of float travel; thus the orientation of arrow 90 between the two tabs indicates the float level at which switching action occurs, relative to the lower and upper extremities of float travel.

Figure 3:
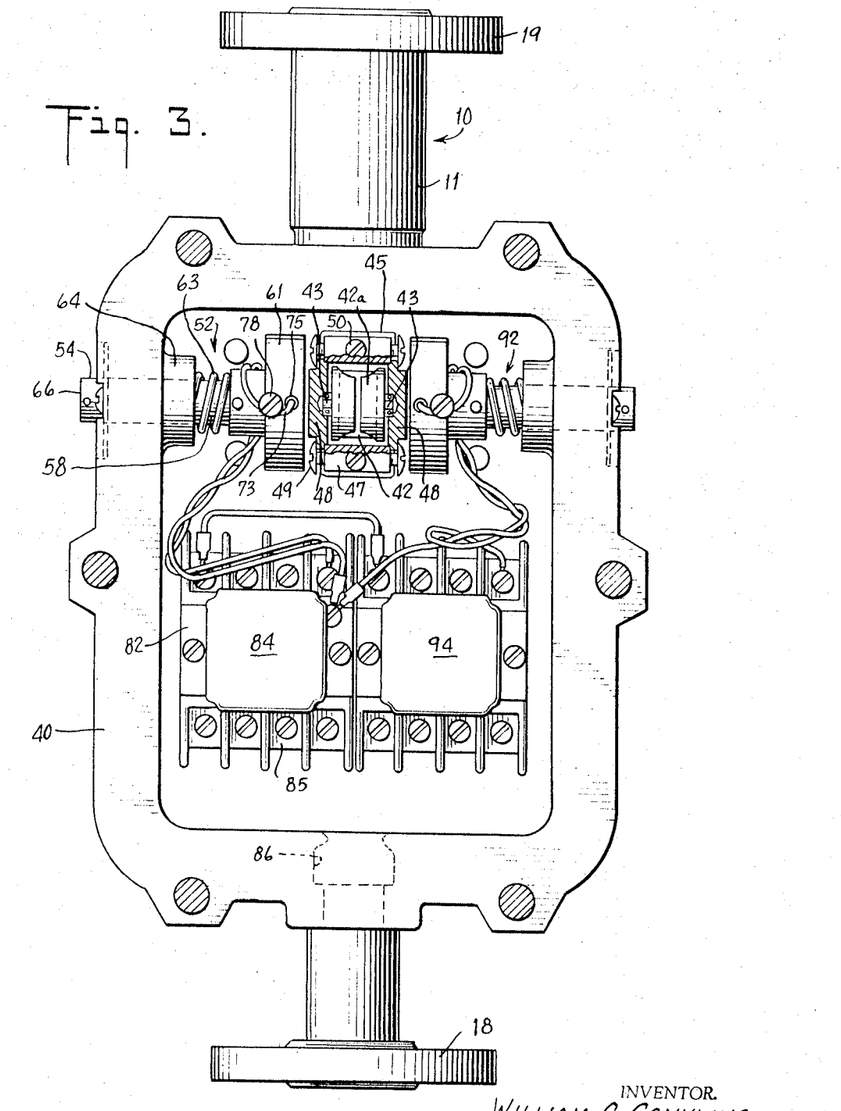
FIG. 3 is a rear evelational view of the interior of the switching device taken as along the line 3—3 of FIG. 1.

As shown in FIGS. 2 and 3, to provide a second and independent alarm switching control, a second switching assembly 92 (identical in structure and arrangement to the assemmbly 52 described above) may be mounted in the housing 40, extending through a side wall of the housing toward the magnet enclosure 45 on the side thereof opposite to switching assembly 52. This assembly likewise operates under the control of the rotatable magnet 42 but may be set to actuate an alarm device (i.e. through a second relay 94, mounted in the housing 40) at a float level which is independent of the setting of the first switching assembly 52. For example, assembly 52 may be set to operate an alarm upon increase of fluid flow beyond a predetermined maximum value, while assembly 92 may be set to operate an alarm upon decrease of flow rate below a predetermined minimum. Since the two switching assemblies operate in the same manner, only the operation of assembly 52 will be discussed in detail.

The operation of the described switching device may be understood by consideration of FIGS. 6–9c. For purposes of illustration, these figures show the reed switch and associated magnets in an arrangement adapted to provide switch-closing operation upon increase of fluid rate through the meter 10 to some predetermined value for which the device is set, e.g. to actuate an alarm upon such increase of flow rate. By way of specific example, the float magnet 32 is shown in FIGS. 6–9c as oriented with its north pole directed upwardly and the biasing magnet 56 is shown as oriented with its south pole facing (i.e. directed toward) the rotatable magnet 42. Further, in these figures the biasing magnet is shown as positioned on the far side of the rotational axis of magnet 42 with respect to the float magnet, so that as magnet 42 rotates (following the float magnet) the pole of magnet 42 closest to the biasing magnet is always that pole which is directed away from the float magnet.

Figures 6, 7, 8A, 8B, 9A, 9B, 9C, 10A, 10B:
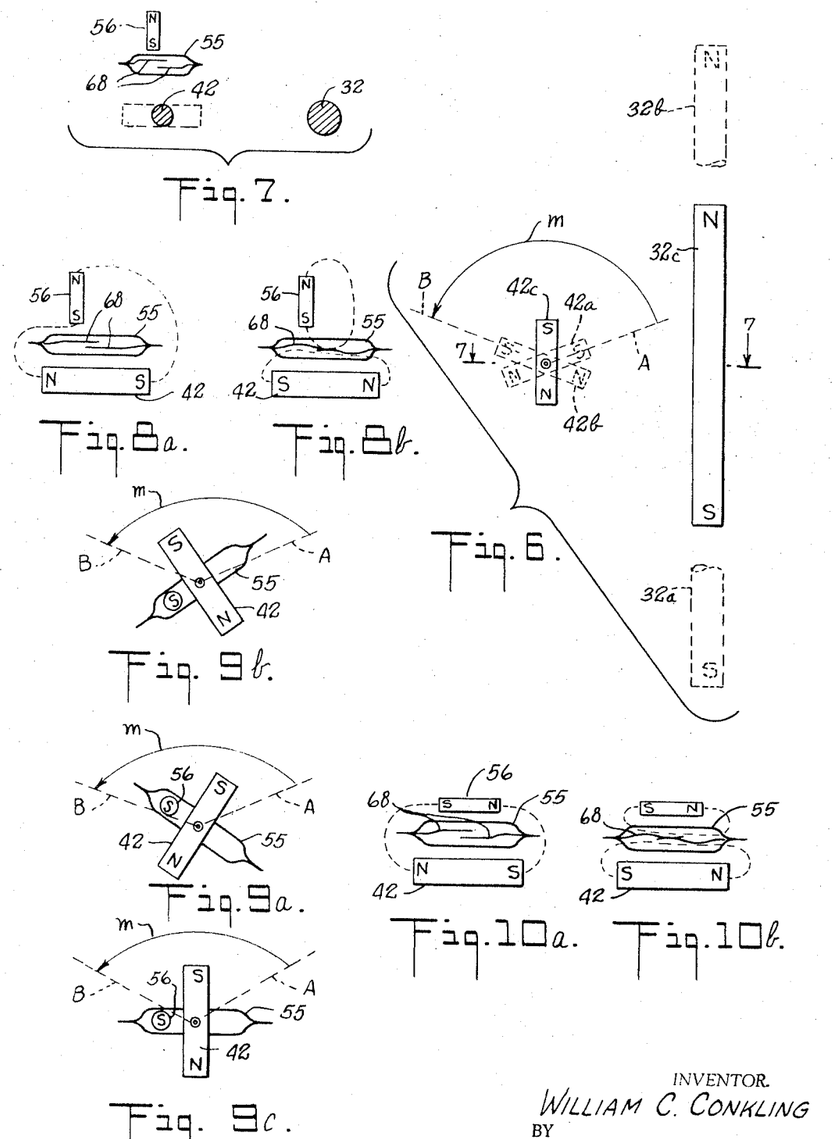
FIG. 6 is a schematic view of the float magnet and rotatable magnet of the apparatus of FIG. 1, showing the relationship between the positions of these two magnets at various float positions.
FIG. 7 is a schematic view taken along the line 7—7 of FIG. 6.
FIGS. 8a and 8b are schematic views, again taken as along the line 7—7 of FIG. 6, showing the relative orientations of the rotatable magnet and biasing magnet corresponding to minimum and maximum field strength, respectively, at the locality of the reed switch.
FIGS. 9a, 9b and 9c are schematic elevational views illustrating the manner in which the switching point float level may be selected by changing the angular position of the reed switch and biasing magnet.
FIGS. 10a and 10b are schematic views similar to FIGS. 8a and 8b showing the magnet positions respectively corresponding to minimum field strength for an alternative axial disposition of the biasing magnet relative to the reed switch and rotatable magnet.

FIG. 6 illustrates schematically the relative positions of the float magnet 32 and the rotatable magnet 42 as the float moves between the lower and upper limits of its path of travel. The position of the float magnet corresponding to the lowermost float position is represented at 32a in FIG. 6, and the position of the float magnet corresponding to the uppermost float position is represented at 32b. When the float is at the midpoint of its path, the float magnet is at the position shown at 32c.

As stated, the rotatable magnet 42 is coupled magnetically to the float magnet so as to undergo angular displacement in correspondence with (and in substantially linear proportion to) vertical movement of the float magnet, assuming a unique angular position for each vertical float magnet position. When the float magnet is at its lowest position 32a, the float magnet pole most closely adjacent to the rotatable magnet is the upper pole, i.e. the north pole; accordingly, the rotatable magnet is oriented with its south pole directed toward the float magnet, assuming the position indicated at 42a. As the float magnet moves upwardly to the midpoint position (32c), the magnet 42 rotates to a vertical position with its south pole directed upwardly, as indicated at 42c, the north and south poles of the float magnet being then equidistant from the south and north poles of the rotatable magnet, respectively. Upon further upward movement of the float magnet to its uppermost position 32b, the south pole of the float magnet becomes the pole most closely adjacent to the magnet 42 and hence magnet 42 rotates beyond the vertical midpoint position 42c to the position indicated at 42b wherein its north pole is directed toward the float magnet.

In other words, vertical movement of the float magnet throughout the length of its path effects angular displacement of the rotatable magnet 42 through a total angle $m$ defined between lines A (corresponding to magnet position 42a) and B (corresponding to magnet position 42b). As stated above, the positions and dimensions of magnets 32 and 42 are preferably so chosen that angle $m$ is slightly less than 180°. The midpoint of this angular excursion of magnet 42 is the vertical position 42c.

The position of the reed switch 55 and biasing magnet 56 in relation to the float magnet 32 and rotatable magnet 42 is illustrated schematically in plan view in FIG. 7. FIGS. 8a and 8b show schematically in similar plan view the effect of angular displacement of magnet 42 on the magnetic field acting on the leaves 68 of the reed switch 55.

Referring then to FIG. 8a, the magnet 42 is shown as oriented with its magnetic axis lying in the plane refined by its axis of rotation and the magnetic axis of biasing magnet 56. Owing to the described eccentric disposition and orientation of the biasing magnet, its south pole (facing magnet 42) is closer to one end pole of magnet 42 than to the other end pole of magnet 42. Specifically, in FIG. 8a magnet 42 is shown as oriented with its north pole adjacent to magnet 56. It will be noted, by reference to FIGS. 6 and 7, that this is the orientation approached when the magnet 42 is in position 42a corresponding to the lowermost position of the float and float magnet.

Thus in the orientation shown in FIG. 8a, the proximate ends of the rotatable and biasing magnets are opposite to each other in polarity. Although the magnetic field of biasing magnet 56 alone would include lines of flux passing through and acting on reed switch 55, its interaction with the rotatable magnet 42 in the FIG. 8a orientation tends to cause the lines of flux of the two magnets to join in their circuits (i.e. to pass internally through booth magnets) bypassing the locality of leaves 68 of the reed switch 55 and thereby depleting the magnetic field acting on the reed switch. In consequence, the field at the reed switch is insufficient to bend the reed switch leaves into circuit-closing contact, and the switch is open, as shown.

If the rotatable magnet 42 is turned through 180° from the position shown in FIG. 8a, so as to bring its magnetic axis again into the plane defined by its rotational axis and the magnetic axis of biasing magnet 56, it assumes the relation shown in FIG. 8b. The pole of magnet 42 most closely adjacent the magnet 56 is then the south pole, this being the orientation approached when magnet 42 is in position 42b corresponding to the uppermost float magnet position. Since the two magnets are thus oriented with like poles in adjacent relation, the magnetic lines of flux of the magnets do not join in their circuits but instead tend to pass through the locality of the reed switch leaves; i.e. in the FIG. 8b orientation, the rotatable magnet field reinforces the biasing magnet field at such locality. This reinforced field is sufficient to cause the reed switch leaves to be bent and held in circuit-closing contact.

As will therefore be understood, at some poin during the 180° angular excursion of the magnet 42 from the position shown in FIG. 8a to the position shown in FIG. 8b (with the biasing magnet held fixed in position), the strength of the field acting on the reed switch increases to a sufficient value to close the switch. In the example herein described, the magnet strengths and positions are so selected that this switching point occurs when the magnet 42 is about halfway between the FIG. 8a and FIG. 8b positions, or in other words when it has been displaced approximately 90° from the position shown in FIG. 8a.

It will be appreciated that if the switch is initially open, it will remain open as long as magnet 42 is oriented at some position between that shown in FIG. 8a and the aforementioned switching point, because the field is then insufficient to close the switch; on the other hand, after magnet 42 passes through the switching point, the switch will remain closed as long as the orientation of magnet 42 relative to the biasing magnet is between the switching point and the position shown in FIG. 8b, because the field is then greater than needed to hold the switch closed. Upon return of magnet 42 through the switching point in the direction of diminishing field strength (toward the FIG. 8b orientation), the switch will reopen, i.e. when magnet 42 reaches a switch-opening angular orientation that is spaced from its switch-closing orientation by a small operating differential. The switch is, therefore, directionally sensitive; but because the field at the reed switch is determined by the cooperative interaction of the biasing and rotatable magnets at all positions of the rotatable magnet, this directional sensitivity does not require that the biasing magnet field strength be necessarily insufficient to close the switch or necessarily sufficient to hold the switch closed, as in the case of previously known switching devices. In other words, the field strength of the biasing magnet alone is less critical than in such prior devices.

As will be seen from consideration of FIGS. 8a and 8b, magnet 42 can rotate from the FIG. 8a (switch-open) orientation to the FIG. 8b (switch-closed) orientation through either of two opposite 180° paths and will in either event pass through a switching point orientation midway between those orientations. Thus if magnet 42 were permitted to rotate through a full 360° relative to the biasing magnet 56, it would pass through two opposed switching points spaced about 180° apart in its path of travel. However, since the angular excursion m of the magnet 42 corresponding to the full range of float magnet movement is less than 180°, the magnet 42 can traverse only a single switching point during such excursion regardless of the angular position of biasing magnet 56; hence there is no ambiguity of switching response to float magnet movement such as might result if the rotatable magnet could pass through two switching points.

In further explanation of the operation of the present switching device, let it be assumed that the biasing magnet 56 (having its south pole facing the rotatable magnet 42) is initially positioned with its magnetic axis lying in the horizontal plane containing the axis of rotation of magnet 42. With the biasing magnet thus disposed, the rotatable magnet comes into switching point orientation therewith when the rotatable magnet is in a vertical position, or in other words, when the rotatable magnet reaches position 42c (FIG. 6) at the midpoint of its angular excursion m. The switching point position of the rotatable magnet 42 for this described position of the biasing magnet is shown in FIG. 9c.

With the biasing magnet in the FIG. 9c setting, as long as the magnet 42 lies in the range of angular positions between the position 42a (indicated by line A in FIG. 9c) corresponding to the lowermost float magnet position and the midpoint position 42c, the magnetic field acting on the reed switch is depleted to a value too low to close the switch. However, when the float magnet rises to the midpoint of its path moving the rotatable magnet to position 42c, the field strength is increased to a value sufficient to close the switch; and the switch remains closed as the field strength continues to increase with further movement of magnet 42 from the switching point position 42c toward the position 42b (line B) corresponding to the uppermost float magnet position. Return of magnet 42 through the switching point toward position 42a, effected by descent of the float, causes the switch to reopen, at an angular position of magnet 42 which is spaced from the switch-closing point 42c by a small operating differential.

In this way, the switch 55 is caused to close when the float and float magnet reach the midpoint of their paths of travel, moving in an upward direction as representative of increase in fluid flow rate through the meter 10 to the particular value corresponding to midpoint float level. Closing of the switch operates the relay 82 in known and conventional manner to actuate an alarm device for signalling such flow rate increase. The switch remains closed and the alarm thus remains operative, as long as the flow rate exceeds the switch-closing value. Reduction in flow rate (and corresponding descent of the float and float magnet) sufficient to return the rotatable magnet 42 to switch-opening position causes the alarm to be shut off.

If it is desired to cause the alarm to signal increase in flow rate to some value different (i.e. higher or lower)

than that represented by the midpoint float level, the biasing magnet 56 is angularly displaced about the axis of rotation of magnet 42 to a new position, this being accomplished simply by manually turning the switch holder 54 relative to the housing 40 of the device shown in FIGS. 1–5.

For example, if it is desired to cause the switch and alarm to operate at a value of flow rate lower than that corresponding to midpoint float level, the biasing magnet is displaced clockwise as seen in FIG. 9c to the position shown in FIG. 9a. The switching point orientation of magnet 42 relative to magnet 56 remains that orientation at which the magnet 42 is axially vertical with respect to the plane defined by its axis of rotation and the magnetic axis of magnet 56; but since this plane is tilted by the rotation of magnet 56, the magnet 42 now comes into switching point orientation with magnet 56 at a position intermediate its positions 42a and 42c. The new switching point position of magnet 42 is shown in FIG. 9a. By comparison of FIGS. 9c and 9a, it will be seen that the described angular displacement of magnet 56 has the effect of moving the switching point position of magnet 42 closer to the magnet position 42a and hence the value of flow rate at which the switch closes is lower than the value corresponding to midpoint float level; i.e. the switch is caused to close (actuating the alarm) in response to increasing flow rate as before, but the alarm-actuating switch operation now occurs as soon as the flow rate reaches this new, lower value. In other respects, the operation of the device as thus adjusted is the same as that described with reference to the magnet setting shown in FIG. 9c; i.e. the alarm is actuated when the magnet 42 reaches the switching point and remains operative as long as the flow rate remains at or above the value corresponding to that switching point position.

Similarly, to set the alarm to operate only upon increase of flow rate to a selected value which is higher than that corresponding to midpoint float level, the biasing magnet 56 is displaced counterclockwise as seen in FIG. 9c about the axis of rotation of magnet 42 (again by manually turning the switch holder 54), e.g. to the position shown in FIG. 9b. The magnet 42 then comes into switching point orientation with magnet 56 only after it moves through the midpoint position 42c to an angular position intermediate positions 42c and 42b. This new switching point angular position of magnet 42, as will be appreciated, corresponds to a value of flow rate higher than the midpoint float level value. As before, the alarm operates if and only if the flow rate is sufficient to cause magnet 42 to move to or beyond the switching point.

It is found that the described switching device, operating in the manner set forth above, provides highly effective and accurate alarm operation and, in use with a vertical fluid entry and exit flowmeter, exhibits an operating differential of not more than about 5 to 10%, depending on meter size. In a typical example of such structure, used with a meter having a 5-inch flow path, the repeatability of alarm switching operation was found to be within ±0.6% of the full path of float travel, or in other words .030 inch. The alarm operation is directionally sensitive, i.e. responding only to increase of flow rate above the selected value and terminating upon decrease of flow rate below such value. The substantially linear relationship between movement of the float magnet 32 and rotatable magnet 42 through the full range of float positions enhances the accuracy of alarm response. Further, it is found that the operation of the switching device is substantially independent of the size of the meter with which it is employed.

Moreover, the flow rate value to which the alarm responds can readily be selected, through the full range of flow rates measurable by the meter, by simply manually turning the switch holder 54. Owing to the provision of this ready means for external adjustment of the switch, there is no need for access to the interior of the switch housing and hence the housing may conveniently be an explosion-proof case as desired for various operations.

While the device of the invention has been described above in an exemplary embodiment arranged for actuation of an alarm to signal increase in fluid flow rate above a predetermined value, it will be appreciated that the device may alternatively be employed to signal decrease of flow rate below a predetermined value. For example, with the switching device arranged as described, the relay 82 may be connected to actuate the alarm circuit upon opening rather than closing of the switch. Alternatively, the switching device itself may be arranged to close upon decrease rather than increase of flow rate through the selected switching point value, e.g. by reversing the polar orientation of either biasing magnet 56 or float magnet 32, or by disposing the biasing magnet on the other side of the rotatable axis of magnet 42—that is, on the side adjacent the float magnet 32.

Further, it will be appreciated that while the magnet 42 has been shown as positioned with its rotational axis lying in the horizontal plane that intersects the midpoint of the float magnet 32, such disposition is not critical to the operation of the device; the rotational axis of magnet 42 may if desired be disposed at a higher or lower level relative to the float magnet path, as may be convenient. In that event, the rotatable magnet will assume the vertical position shown at 42c in FIG. 6 when the float magnet reaches a position at which its geometric center lies in the horizontal plane containing the rotational axis of magnet 42, assuming that such rotational axis extends (as shown) through the geometric center of magnet 42.

In the device of FIGS. 1–5, the operation of the second switching assembly 92 is identical to the described operation of the first switching assembly 52. As will be understood, the rotatable magnet 42 interacts both with the biasing magnet 56 of assembly 52 and with the corresponding biasing magnet of assembly 92 to control the operation of the switches in the respective assemblies. Since the assembly 92 is settable independently of assembly 52, its angular position may be adjusted to produce alarm-actuating switch operation at any desired float level (corresponding to a predetermined flow rate) different from that to which the assembly 52 responds.

Also, while the device has been described as arranged to actuate an alarm, it may be used to perform any other desired control function in response to increase of fluid flow rate above, and/or decrease of fluid flow rate below one or more predetermined values.

When two positionally opposed switching assemblies are included in a single switching device as shown in FIGS. 2 and 3, it is preferred that the axial orientation of the biasing magnet 56 in each such assembly be perpendicular to the plane of rotation of magnet 42, i.e. as shown in FIGS. 1–9c, not only because of the simplicity of structural arrangement thereby achieved in each assembly, but also because the described orientation minimizes interaction between the two pairs of switches and biasing magnets located on the opposite sides of the rotatable magnet. The interaction effect is slight and may be readily accommodated by compensatory adjustment of the switching point setting of one switching assembly when the opposed switching assembly is moved appreciably.

In a broad sense, however, the axial orientation of the biasing magnet is not critical so long as at least one of its poles is disposed in eccentric relation to the rotational axis of magnet 42. For example, the biasing magnet 56 may be aligned with its magnetic axis extending in parallel relation to the plane of rotation of magnet 42, as shown in FIGS. 10a and 10b, which correspond respectively to FIGS. 8a and 8b; as thus disposed, the poles of the biasing magnet are again in eccentric relation to the rotational axis of magnet 42, so that angular displacement of magnet 42 changes the orientation of its poles relative to the biasing magnet poles. The interaction of the biasing and rotatable magnets in the arrangement of FIGS. 10a and 10b is essentially the same as in the arrangement of FIGS. 8a and 8b; i.e. when the rotatable magnet is in the orientation shown in FIG. 10a relative to biasing magnet 56, with its magnetic axis lying in the plane defined by its rotational axis and the magnetic axis of biasing magnet 56, and with its poles respectively in proximate relation to opposite poles of the biasing magnet, the field acting on the reed switch is depleted and the switch is open. Rotation of the magnet 42 through 180° to the orientation shown in FIG. 10b wherein the poles of magnet 42 are respectively adjacent to like poles of the biasing magnet, causes reinforcement of the field at the reed switch so that the switch is closed. The switching point occurs at some orientation intermediate those shown in FIGS. 10a and 10b, e.g. when magnet 42 is about midway between those orientations.

Although the device of FIGS. 1–5 is shown as provided with two switching assemblies, if desired the device may include only a single switching assembly, for actuating an alarm (or performing some other control function) in response to only a single predetermined flow rate condition. A switching device in accordance with the invention, having only a single switching assembly 52 (identical in structure and arrangement to the assembly 52 of FIGS. 1–5) is illustrated in FIG. 11.

It is to be understood that the invention is not limited to the features and embodiments hereinabove specifically set forth, but may be carried out in other ways without departure from its spirit.

I claim:
1. In a device for switching an electric circuit in response to displacement of a movable element, in combination,
(a) a first magnet having spaced poles. mounted to undergo angular displacement about an axis of rotation intersecting a line connecting said poles in corresponding with displacement of said movable element such that the angular position and direction of movement of said first magnet are uniquely determined by the position and direction of movement of said movable element;
(b) a second magnet positioned to interact with said first magnet to establish at a given locality a magnetic field that varies progressively in strength between a minimum value and a maximum value in accordance with change in angular orientation of said first magnet relative to said second magnet produced by progressive angular displacement of said first magnet about said axis of rotation; and
(c) magnetic field-responsive means positioned at said given locality for switching said electric circuit between open and closed condition, adapted to maintain said circuit in one of said conditions when the magnetic field strength at said locality is less than a given value intermediate said minimum and maximum values, and to maintain said circuit in the other of said conditions when said field strength is greater than said given value, and operable to switch said circuit from said one condition to said other condition upon increase in said field strength to said given value produced by angular displacement of said first magnet in a given direction into a particular angular orientation relative to said second magnet; and
(d) means for selectively angularly displacing said second magnet about an axis substantially coincident with the axis of first-magnet rotation to select the first-magnet angular position at which said first magnet assumes said particular angular orientation relative to said second magnet.

2. In a device for switching an electric circuit in response to displacement of a movable element, in combination,
(a) a first magnet having spaced poles, mounted to undergo angular displacement about an axis of rotation intersecting a line connecting said poles in correspondence with displacement of said movable element such that the angular position and direction of movement of said first magnet are uniquely determined by the position and direction of movement of said movable element;
(b) a second magnet positioned to interact with said first magnet to establish at a given locality a magnetic field that varies progressively in strength between a minimum value and a maximum value in accordance with change in angular orientation of said first magnet relative to said second magnet produced by progressive angular displacement of said first magnet about said axis of rotation; and
(c) magnetic field-responsive means positioned at said given locality for switching said electric circuit between open and closed condition, adapted to maintain said circuit in one of said conditions when the magnetic field strength at said locality is less than a given value intermediate said minimum and maximum values, and to maintain said circuit in the other of said conditions when said field strength is greater than said given value, and operable to switch said circuit from said one condition to said other condition upon increase in said field strength to said given value produced by angular displacement of said first magnet in a given direction into a particular angular orientation relative to said second magnet, said magnet, said movable element being displaceable within a path of finite extent; and
(d) a third magnet having spaced poles, connected to said movable element so as to be displaceable along a substantially rectilinear path extending in the direction of its magnetic axis in correspondence with displacement of said movable element, said first magnet being disposed in magnetically coupled relation to said third magnet so as to undergo angular displacement about said axis of rotation in correspondence with linear displacement of said third magnet.

3. In a device for switching an electric circuit in response to displacement of a movable element, in combination,
(a) a first magnet having spaced poles, mounted to undergo angular displacement about an axis of rotation intersecting a line connecting said poles in correspondence with displacement of said movable element such that the angular position and direction of movement of said first magnet are uniquely determined by the position and direction of movement of said movable element, said axis of first-magnet rotation perpendicularly intersecting said line connecting said poles intermediate said poles such that the plane of rotation of said first magnet contains said line;
(b) a second magnet positioned to interact with said first magnet to establish at a given locality a magnetic field that varies progressively in strength between a minimum value and a maximum value in accordance with change in angular orientation of said first magnet relative to said second magnet produced by progressive angular displacement of said first magnet about said axis of rotation, said second magnet being disposed to one side of said plane of first-magnet rotation in spaced relation thereto, at least one pole of said second magnet being disposed eccentrically of said axis of first-magnet rotation; and
(c) magnetic field-responsive means positioned at said given locality for switching said electric circuit between open and closed condition, adapted to maintain said circuit in one of said conditions when the magnetic field strength at said locality is less than a given value intermediate said minimum and maximum values, and to maintain said circuit in the other of said conditions when said field strength is greater than said given value, and operable to switch said circuit from said one condition to said other condition upon increase in said field strength to said given value produced by angular displacement of said first magnet in a given direction into a particular angular orientation relative to said second magnet, said field-responsive means being disposed intermediate said second magnet and said plane of first-magnet rotation.

4. A device as defined in claim 3, wherein said movable element is displaceable within a path of finite extent; wherein the relative angular orientations of said first and second magnets respectively producing said minimum and maximum values of field strength correspond to angular positions of said first magnet spaced about 180° apart; and further including means coupling said movable element with said first magnet for producing angular displacement of said first magnet through an angle of not more than about 180° in correspondence with displacement of said movable element through the entire extent of its path.

5. A device as defined in claim 4, including stationary support structure for said device; means rotatably mounting said first magnet in said support structure; and means carrying said second magnet and field-responsive means, said carrying means being mounted on and rotatable relative to said support structure by application of external force about an axis substantially coincident with said axis of first-magnet rotation, for effecting selective angular displacement of said second magnet and field-responsive means about said axis to select the first-magnet angular position at which said first magnet assumes said particular angular orientation relative to said second magnet, said carrying means including means frictionally engaging said support structure for holding said carrying means fixed in relation to said support structure in any angular position to which said carrying means is rotated.

6. A device as defined in claim 5, wherein said coupling means comprises an elongated and end-polarized bar magnet connected to said movable element so as to undergo displacement therewith along a rectilinear path extending in the direction of the magnetic axis of said bar magnet; and wherein said first magnet is disposed at a locality laterally spaced from said path, in magnetically coupled relation to said bar magnet so as to undergo angular displacement in correspondence with linear displacement of said bar magnet along said path, with said first-magnet axis of rotation lying in a plane perpindicularly intersecting said bar-magnet path at a locality intermediate the ends of said path.

7. A device as defined in claim 6, wherein said field-responsive means is a reed switch.

8. In a device for independently switching two electric circuits in response to displacement for a movable element, in combination,
(a) an elongated and end polarized bar magnet connected to said movable element so as to undergo displacement therewith along a rectilinear path of finite extent aligned with the magnetic axis of said bar magnet;
(b) support structure fixedly positioned in spaced lateral relation to said bar magnet path;
(c) a rotatable magnet having spaced poles, mounted in said support structure to undergo angular displacement about an axis of rotation perpendicularly intersecting a line connecting said poles, so that its plane of rotation contains said line, said axis of rotation lying in a plane perpendicularly intersecting said bar magnet path, and said rotatable magnet being disposed in magnetically coupled relation to said bar magnet so as to undergo angular displacement about said axis of rotation in correspondence with displacement of said bar magnet, the angular position and direction of movement of said rotatable magnet being uniquely determined by the position and direction of movement of said bar magnet; and
(d) a pair of switching assemblies, mounted on said support structure and respectively positioned on opposite sides of the plane of rotation of said rotatable magnet, each of said switching assemblies comprising:
(i) a biasing magnet disposed in spaced relation to said plane of rotation of said rotatable magnet, at least one pole of said biasing magnet being disposed eccentrically of said axis of rotation of said rotatable magnet, said biasing magnet being positioned to interact with said rotatable magnet to establish at a given locality therebetween a magnetic field that varies progressively in strength between a minimum value and a maximum value in accordance with change in angular orientation of said rotatable magnet relative to said biasing magnet produced my progressive angular displacement of said rotatable magnet about said axis of rotation;
(ii) magnetic field-responsive means positioned at said given locality for switching one of said electric circuits between open and closed condition, adapted to maintain said one circuit in one of said conditions when the magnetic field strength at said locality is less than a given value intermediate said minimum and maximum values, and to maintain said one circuit in the other of said conditions when said field strength is greater than said given value, and operable to switch said one circuit from said one condition to said other condition upon increase in said field strength to said given value produced by angular displacement of said rotatable magnet in a given direction into a particular angular orientation relative to said biasing magnet; and
(iii) means carrying said biasing magnet and field-responsive means, mounted on and rotatable relative to said support structure by application of external force about an axis substantially coincident with said axis of rotation of said rotatable magnet, for effecting selective angular displacement of said biasing magnet and field-responsive means about said axis of rotation to select the angular position of said rotatable magnet at which said rotatable magnet assumes said particular angular orientation relative to said biasing magnet, said carrying means including means frictionally engaging said support structure for holding said carrying means fixed in relation to said support structure in any angular position to which said carrying means is rotated.

9. In a variable restriction fluid flowmeter, in combination with a stationary tube member defining a vertically extending passage for fluid flow and a movable float member disposed in the passage for vertical movement therein between upper and lower limits in correspondence with variations in flow rate of fluid traversing said passage, said tube and float members being mutually shaped to define a space for fluid flow between them varying progressively in area with change in vertical position of said float in said passage, a device for switching an electric circuit in response to displacement of said float in a given direction to a predetermined position in said passage, said device comprising:
(a) an end-polarized permanent bar magnet carried by said float for movement therewith along an axially vertical path of limited extent and having its magnetic axis aligned with the axis of said path;
(b) support structure fixedly mounted externally of said tube member in lateral relation to said bar-magnet path;
(c) a rotatable magnet having spaced poles, mounted in said support structure to undergo angular displacement about a horizontal axis of rotation perpendicularly intersecting a line connecting said poles, so that its plane of rotation contains said line, said axis of rotation lying in a plane perpendicularly intersecting said bar magnet path, and said rotatable magnet being disposed in magnetically coupled relation to said bar magnet so as to undergo angular displacement about said axis of rotation in correspondence with displacement of said bar magnet, the angular position and direction of movement of said rotatable magnet being uniquely determined by the position and direction of movement of said bar magnet;

(d) a biasing magnet disposed in spaced relation to said plane of rotation of said rotatable magnet, at least one pole of said biasing magnet being disposed eccentrically of said axis of rotation of said rotatable magnet, said biasing magnet being positioned to interact with said rotatable magnet to establish at a given locality therebetween a magnetic field that varies progressively in strength between a minimum value and a maximum value in accordance with change in angular orientation of said rotatable magnet relative to said biasing magnet produced by progressive angular displacement of said rotatable magnet about said axis of rotation; and (e) magnetic field-responsive means positioned at said given locality for switching said electrical circuit between open and closed condition, adapted to maintain said circuit in one of said conditions when the magnetic field strength at said locality is less than a given value intermediate said minimum and maximum values, and to maintain said circuit in the other of said conditions when said field strength is greater than said given value, and operable to switch said circuit from said one condition to said other condition upon increase in said field strength to said given value produced by angular displacement of said rotatable magnet in a given direction into a particular angular orientation relative to said biasing magnet.

10. A device as defined in claim 9, further including means carrying said biasing magnet and field-responsive means, mounted on and rotatable relative to said support structure by application of external force about an axis substantially coincident with said axis of rotation of said rotatable magnet, for effecting selective angular displacement of said biasing magnet and field-responsive means about said axis of rotation to select the angular position of said rotatable magnet at which said rotatable magnet assumes said particular angular orientation relative to said biasing magnet, said carrying means including means frictionally enagaging said support structure for holding said carrying means fixed in relation to said support structure in any angular position to which said carrying means is rotated.

11. A device as defined in claim 10, wherein said bar magnet and said rotatable magnet are mutually disposed and dimensioned so that vertical displacement of said bar magnet between the upper and lower limits of its path effects angular displacement of said rotatable magnet through an angle of not more than about 180°.

References Cited

UNITED STATES PATENTS

| 2,419,942 | 5/1947 | Brewer. | |
| 2,425,691 | 8/1947 | Brewer | 73—209 |
| 3,164,989 | 1/1965 | Busillo et al. | |
| 3,224,270 | 12/1965 | Karol et al. | |
| 3,287,970 | 11/1966 | Harris | 73—209 |

ROBERT K. SCHAEFER, *Primary Examiner.*

H. BURKS, *Assistant Examiner.*

U.S. Cl. X.R.

73—209; 335—205